(12) United States Patent
Manoj (10) Patent No.: US 7,694,171 B2
(45) Date of Patent: Apr. 6, 2010

(54) RAID5 ERROR RECOVERY LOGIC

(75) Inventor: Jose K. Manoj, Lilburn, GA (US)

(73) Assignee: LSI Corporation, Milpitas, CA (US)

( * ) Notice: Subject to any disclaimer, the term of this patent is extended or adjusted under 35 U.S.C. 154(b) by 623 days.

(21) Appl. No.: 11/607,625

(22) Filed: Nov. 30, 2006

(65) Prior Publication Data

US 2008/0133969 A1    Jun. 5, 2008

(51) Int. Cl.
*G06F 11/00*    (2006.01)
(52) U.S. Cl. ........................................................ 714/5
(58) Field of Classification Search ................. 714/5–8
See application file for complete search history.

(56) References Cited

U.S. PATENT DOCUMENTS

| | | | | |
|---|---|---|---|---|
| 5,432,922 | A * | 7/1995 | Polyzois et al. ................. | 714/6 |
| 5,537,567 | A * | 7/1996 | Galbraith et al. ............ | 711/114 |
| 6,243,827 | B1 * | 6/2001 | Renner, Jr. ...................... | 714/6 |
| 6,732,230 | B1 * | 5/2004 | Johnson et al. ............. | 711/114 |
| 7,149,930 | B2 * | 12/2006 | Ogawa et al. .................. | 714/42 |
| 7,337,353 | B2 * | 2/2008 | Yamamoto et al. ............. | 714/7 |
| 2002/0035704 | A1 * | 3/2002 | Wilson ........................... | 714/6 |
| 2003/0163757 | A1 * | 8/2003 | Kang et al. ..................... | 714/6 |
| 2005/0114726 | A1 * | 5/2005 | Ouchi ........................... | 714/5 |
| 2005/0278476 | A1 * | 12/2005 | Teske et al. ................. | 711/100 |
| 2006/0015769 | A1 * | 1/2006 | Ikeuchi et al. ................... | 714/5 |
| 2007/0185942 | A1 * | 8/2007 | Hitz et al. .................... | 707/205 |

* cited by examiner

*Primary Examiner*—Bryce P Bonzo
(74) *Attorney, Agent, or Firm*—Christopher P. Maiorana, PC (57) ABSTRACT

A method for recovering errors on a multiple disk system. The method including the steps of (a) determining a location and type for one or more errors in a plurality of blocks on the multiple disk system, (B) determining a current error of the one or more errors that is closest to a start of the plurality of blocks, (C) recovering data for the current error using data read from drives other than the drive containing the current error and (D) determining whether any further errors are present on the drive that contained the current error.

20 Claims, 9 Drawing Sheets

RAID5 ERROR RECOVERY LOGIC

FIELD OF THE INVENTION

The present invention relates to redundant storage generally and, more particularly, to a method and/or apparatus for implementing RAID5 error recovery logic.

BACKGROUND OF THE INVENTION

In computing, one type of data storage scheme using multiple hard drives to share or replicate data among the drives is referred to as a RAID system. The acronym RAID stands for redundant array of inexpensive disks, or redundant array of independent disks. Depending on the configuration of the RAID system, typically referred to as the RAID level, the benefit of RAID can include one or more of increased data integrity, fault tolerance, throughput or capacity when compared to single drives. One of the most popular RAID levels is RAID5. RAID5 has achieved popularity due to its low cost of redundancy. RAID systems can combine multiple low cost older technology devices into an array that offers greater capacity, reliability, speed, or a combination thereof, than is affordably available in a single device using the latest technology.

At the simplest level, a RAID system combines multiple hard drives into a single logical unit (or drive). The operating system sees a single logical drive instead of multiple different hard drives. RAID is typically used on server computers and is usually, but not necessarily, implemented with disk drives having the same size. With decreases in hard drive prices and wider availability of RAID options built into motherboard chip sets, RAID can also be found as an option in more advanced personal computers, especially in computers dedicated to storage intensive tasks such as video and audio editing. RAID5 writes are expensive in terms of disk operation and traffic between the disks and the controller.

It would be desirable to have an error recovery scheme for a RAID5 system that reduces the number of IOs and can handle multiple errors on different drives at different sectors.

SUMMARY OF THE INVENTION

The present invention concerns a method for recovering errors on a multiple disk system. The method including the steps of (a) determining a location and type for one or more errors in a plurality of blocks on the multiple disk system, (B) determining a current error of the one or more errors that is closest to a start of the plurality of blocks, (C) recovering data for the current error using data read from drives other than the drive containing the current error and (D) determining whether any further errors are present on the drive that contained the current error.

The objects, features and advantages of the present invention include providing a method and/or apparatus for implementing RAID5 error recovery logic that may (i) provide read error recovery, (ii) provide read error recovery during peer reads (e.g., a peer read method), (iii) provide read error recovery during old data reads (e.g., a read modify method), (iv) provide special task (e.g., check consistency, rebuilding, background initialization) read error recovery, (v) be used for error recovery for other raid levels; (vi) handle any number of errors in a stripe, (vii) handle different types of errors in a stripe, (viii) issue a minimal number of IO requests to the hardware layer, (ix) provide a less complex error recovery process, (x) provide a faster error recovery process, and/or (xi) use a top down approach to solve errors.

BRIEF DESCRIPTION OF THE DRAWINGS

These and other objects, features and advantages of the present invention will be apparent from the following detailed description and the appended claims and drawings in which:

FIGS. 7(A-C) are diagrams illustrating a process for recovery from a second media error on a second drive of the RAID5 system of FIG. 2;

FIGS. 8(A-C) are diagrams illustrating recovery from a third media error on a third drive of the RAID5 system of FIG. 2;

FIGS. 9(A-B) are diagrams of a process for recovering from an unrecoverable error in the RAID5 system of FIG. 2;

DETAILED DESCRIPTION OF THE PREFERRED EMBODIMENTS

The present invention may provide an improved RAID5 error recovery logic (or process) that may minimize the number of read operations performed for error recovery. The present invention may provide a solution that is simple to implement. The present invention may provide a sequence of logical steps followed that may result in minimal read operations and may handle multiple errors. The present invention may also handle recoverable errors and non-recoverable errors in the same stripe.

Figure 1:
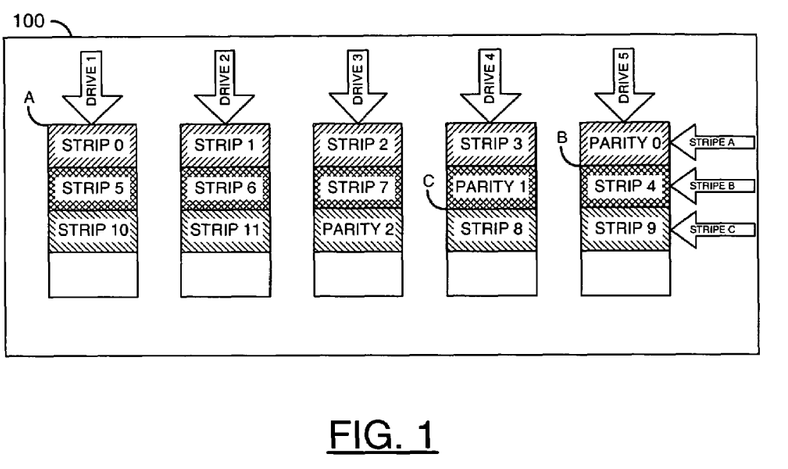
FIG. 1 is a diagram illustrating a disk structure of a RAID5 system.

Referring to FIG. 1, a diagram of a system 100 is shown illustrating a number of disk drives arranged as a RAID5 system. In one example, the system 100 may be implemented with five drives (e.g., Drive 1-5). However, the system 100 may be implemented with other numbers of drives to meet the design criteria of a particular implementation. A series of strips is collectively called a "stripe". Each strip comprises a number of blocks (or sectors). The system 100 may be implemented with RAID5 block level striping with parity data distributed across all member disks. For example a first stripe (e.g., STRIPE A) may comprise strips 0-3 and a parity block PARITY 0. A second stripe (e.g., STRIPE B) may comprise strips 4-7 and a parity block PARITY 1. A third stripe (e.g., STRIPE C) may comprise strips 8-11 and a parity block PARITY 2. A starting point (or sector) for each of the stripes is indicated by the letters A, B and C, respectively. The particular disk used for each parity block (e.g., PARITY 0, PARITY 1, PARITY 2, etc.) is generally staggered from one stripe to the next, hence the term distributed parity blocks.

When a block (or sector) is written to one of the disks in the system 100, a parity block is generated within the same stripe. For example, when a strip (e.g., Strip 0), or some portion of the strip, is written on a stripe (e.g., STRIPE 1), the parity strip (e.g., PARITY 0), or some portion of the parity strip, is recalculated and rewritten. For small writes, the old data is read, new parity is written and new data is written.

Figure 2:
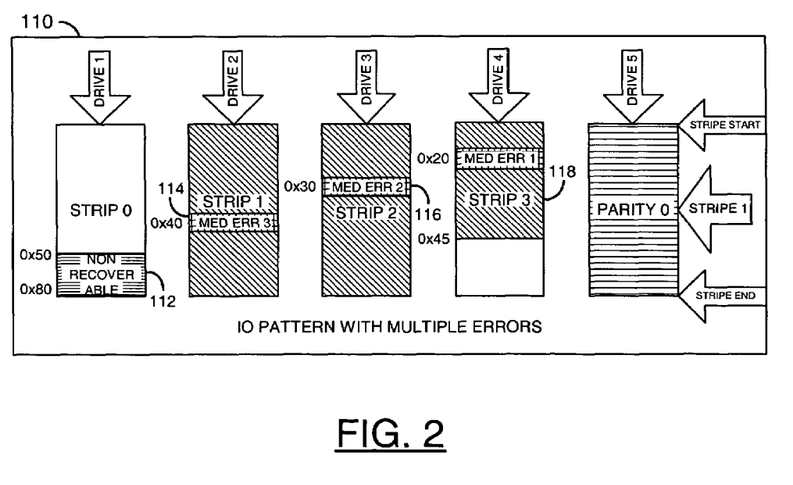
FIG. 2 is a diagram illustrating an input/output (IO) operation occurring on a five drive RAID5 system with multiple errors.

Referring to FIG. 2, a block diagram is shown illustrating data stored in a stripe 110 on the system 100. In one example, an IO operation may read the stripe 110 from the system 100. A parity strip (e.g., PARITY 0) of the stripe 110 may be located, for example, on drive 5. The read operation may start from sector 0x50 on Drive 1 and run to sector 0x45 on Drive 4. In one example, the stripe 110 may contain an input/output (IO) pattern with multiple errors. For example, the read operation on Drive 1 may result in a non-recoverable error 112, the read operation on Drive 2 may result in a recoverable medium error 114 at sector number 0x40, the read operation on Drive 3 may result in a recoverable medium error 116 at sector number 0x30 and the read operation on Drive 4 may result in a recoverable medium error 118 at sector number 0x20.

Figure 3:
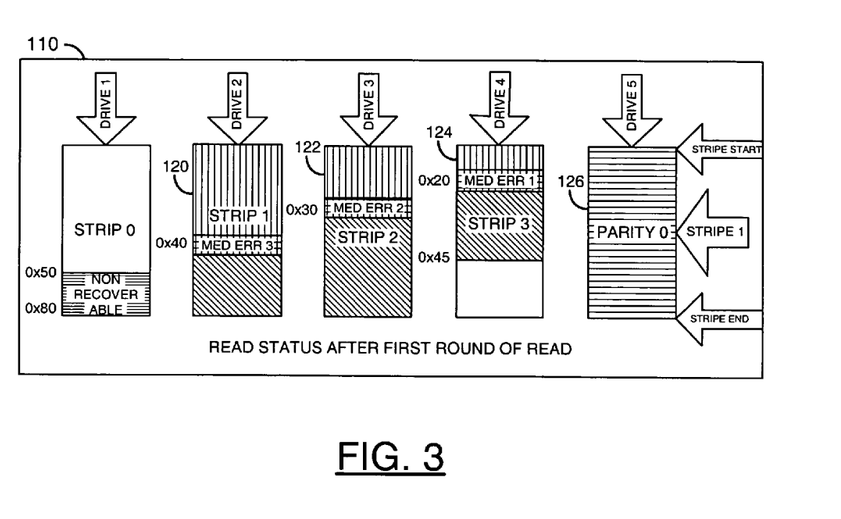
FIG. 3 is a diagram illustrating a read status after a first round of a read operation on all of the drives of the RAID5 system of FIG. 2.

Referring to FIG. 3, a diagram is shown illustrating an IO status of the stripe 110 of FIG. 2 after a first stage of read operations on all of the drives. In general, the read operations on each of the drives retrieves the data stored on the drive up to the error. For example, on Drive 1, the read operation results in an unrecoverable error and none of the data between sector 0x50 and 0x80 may be retrieved. On Drive 2, a portion 120 of data (e.g., up to the sector 0x40) may be read properly. On Drive 3, a portion 122 of data (e.g., up to the sector 0x30) may be read properly. On Drive 4, a portion 124 of data (e.g., up to the sector 0x20) may be read properly. On Drive 5, all of the parity data 126 may be retrieved. In one example, a Hardware Abstraction Layer (HAL) of the system 100 may notify an error recovery module implemented in accordance with the present invention of each of the errors occurring at sectors 0x40, 0x30 and 0x20. The error recovery module may be configured to perform an error recovery process in accordance with the present invention (an example of which is described below in connection with FIGS. 4-9).

Figure 4:
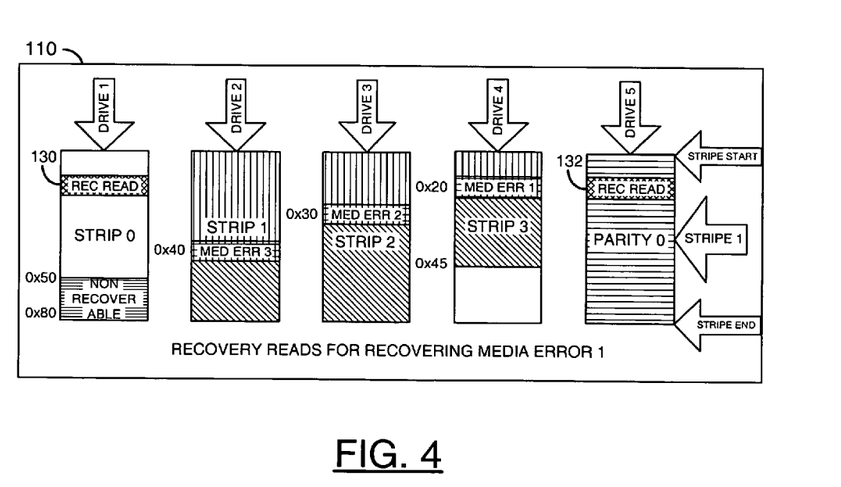
FIG. 4 is a diagram illustrating recovery read operations for recovering a first media error.

Referring to FIG. 4, a diagram is shown illustrating an initial step of an error recovery process in accordance with the present invention. In one example, the error recovery process may begin by determining the type and sector of the detected error closest to the start of the stripe sectors (e.g., the media error at sector 0x20 on Drive 4 in the present example). For example, the media error on drive 4 is at the lowest block address (e.g., 0x20) of the errors in the stripe 110.

To recover the data for sector 0x20 on Drive 4 from the peer drives (e.g., Drives 1, 2 and 3) and from the parity drive (e.g., Drive 5), the error recovery process of the present invention starts by scanning for the data from Drive 0 to Drive 5 (e.g., from left to right). In Drive 1, the data is not available and a portion 130 of data at sector 0x20 on strip 0 is read. For Drive 2, the data at sector 0x20 is already available from the initial read operation and no further read is performed. Similarly, on Drive 3 the data at sector 0x20 is already available, so no read is performed. Drive 5 is the parity drive for the stripe and a portion 132 of data at sector 0x20 is read to obtain the parity information. After reading the data for recovery, the media error data may be recovered, in one example, by X-ORing the data read from Drive 1, the data available from drive 2, the data available from Drive 3 and the parity data read from Drive 5.

Figure 5:
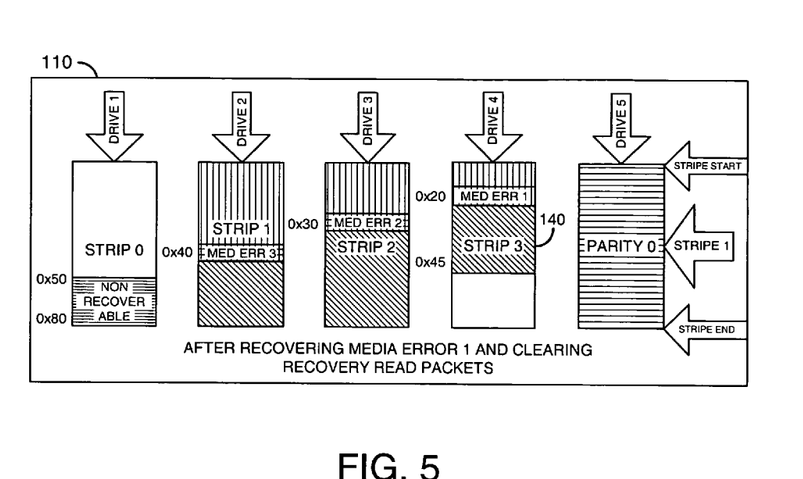
FIG. 5 is a diagram illustrating a read operation to recover data from the drive on which the first media error occurred.

Referring to FIG. 5, a diagram of the stripe 110 is shown illustrating an example of the data population after recovering the first media error. Instead of recovering the other previously detected errors, a next step of the recovery process in accordance with the present invention may perform a read to recover a remainder 140 of the data on the drive on which the media error data was just recovered (e.g., on Drive 4). By reading the data on the drive on which the media error data was just recovered, the present invention may detect possible additional media errors prior to where the next media error is known to be present (e.g., between sector 0x20 and sector 0x30). Moreover, reading the remainder of the data on the drive on which the media error data was just recovered may have an advantage of saving recovery reads for recovery of the media errors on the other drives.

Figure 6:
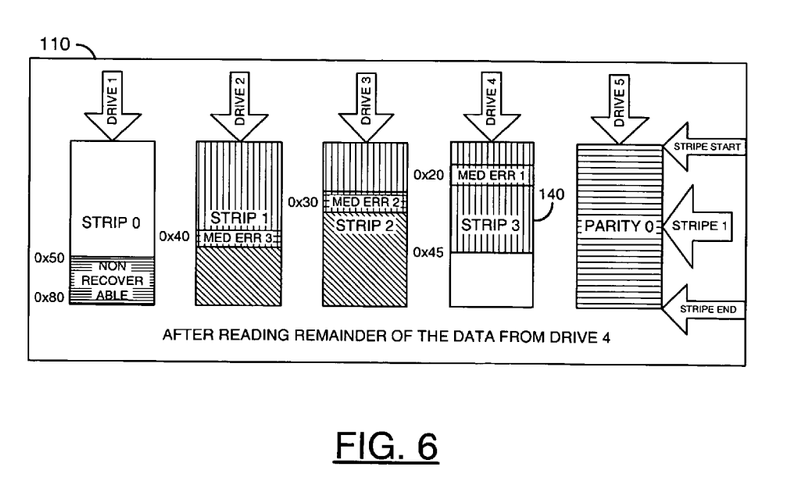
FIG. 6 is a diagram illustrating data available after recovering data from the drive on which the first media error occurred.

Referring to FIG. 6, a diagram of the stripe 110 is shown illustrating an example of the data population after the remainder 140 of the data on the Drive 4 is recovered. When the remainder 140 has been recovered without further errors, the data from Drive 4 is fully available. For example, the data available in the Drive 4 data buffer may be used to recover the second media error and the third media error.

Figure 7:
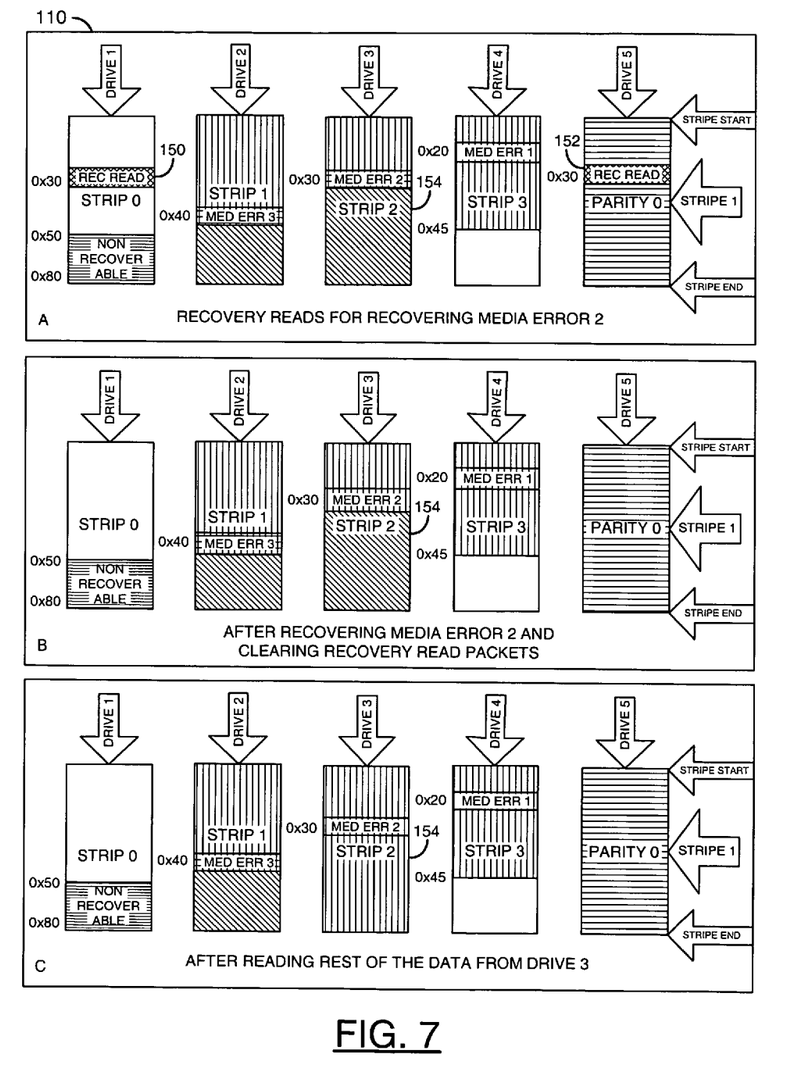

Referring to FIGS. 7(A-C), a set of diagrams is shown illustrating recovery of the data for the second media error of the stripe 110. The error recovery process in accordance with the present invention may continue by determining the type and sector of the one of the remaining detected errors that is closest to the start of the stripe sectors (e.g., the media error at sector 0x30 on Drive 3 in the present example). The media error on Drive 3 is at the lowest sector (e.g., 0x30) of the remaining errors on the stripe 110. Recovery of the data of the second media error (e.g., MED ERR 2) may be performed similarly to the recovery operation for the first media error MED ERR 1.

For example, referring to FIG. 7(A), the error recovery process in accordance with the present invention may be continued by reading a portion 150 at sector 0x30 on Drive 1, and a portion 152 of the parity data from Drive 5. The portion 150, the portion 152, the data in the buffer of Drive 2 and the data in the buffer of Drive 4 may be used to recover the media error on Drive 3. For example, the data for the second media error MED ERR 2 may be recovered, in one example, by X-ORing the data read from Drive 1, the data available from Drive 2, the data available from Drive 4 and the parity data read from Drive 5.

Referring to FIG. 7(B), the recovery process may also perform a read to recover a remainder 154 of the data on the drive on which the media error data was just recovered (e.g., on Drive 3). By reading the data on the drive on which the media error data was just recovered, the present invention may detect possible additional media errors prior to where the next media error is known to be present (e.g., between sector 0x30 and sector 0x40). Moreover, reading the remainder of the data on the drive on which the media error data was just recovered may have an advantage of saving recovery reads for recovery of the media errors on the other drives. Referring to FIG. 7(C), a diagram of the stripe 110 is shown illustrating an example of the data population after the remainder 154 of the data on the Drive 3 is recovered.

Figure 8:
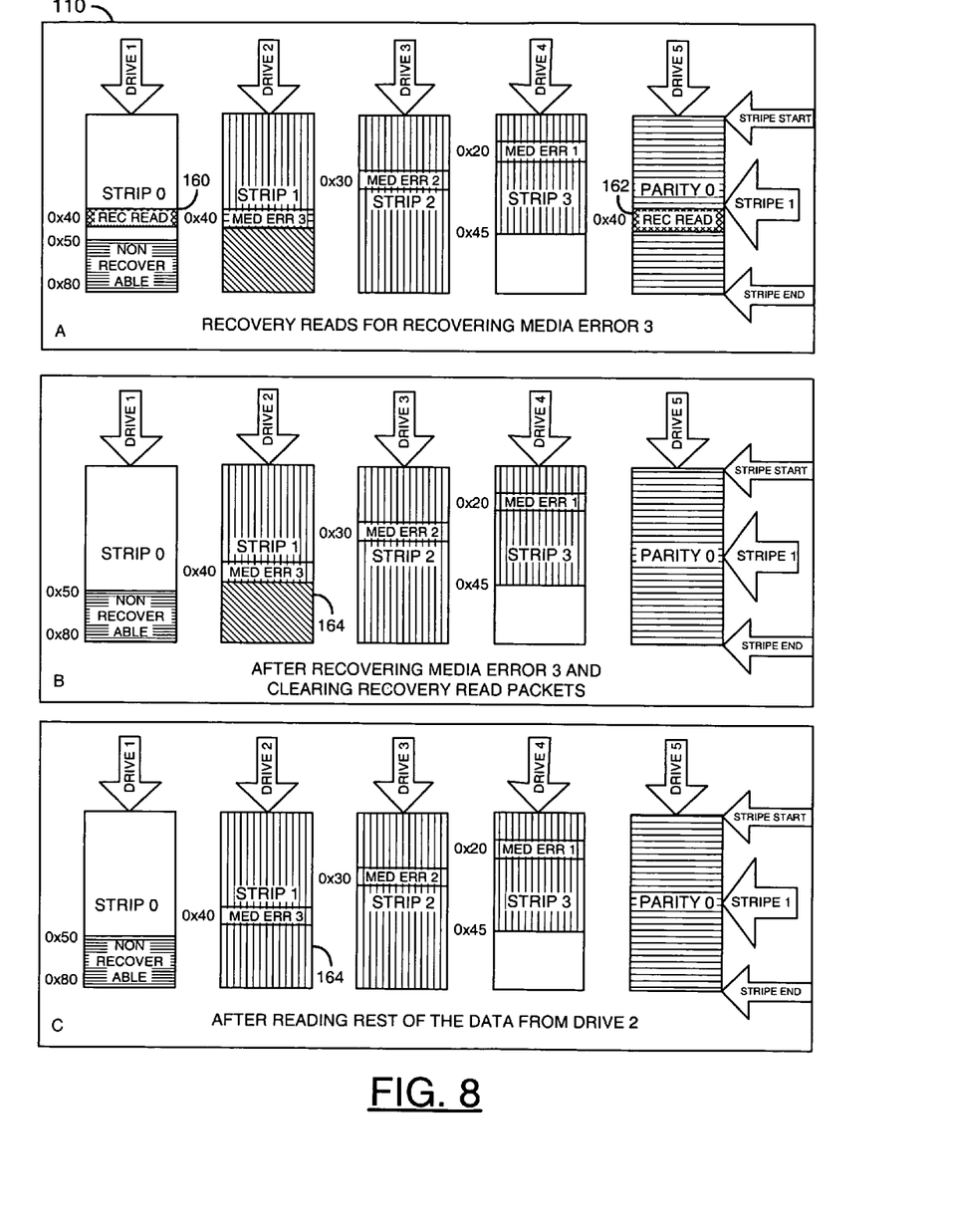

Referring to FIGS. 8(A-C), a set of diagrams is shown illustrating recovery of the data for the third media error (e.g., MED ERR 3) of the stripe 110. After recovery the data for the second media error, the error recovery process in accordance with the present invention may continue by determining the type and sector of the one of the remaining detected errors that is closest to the start (e.g., lowest block address) of the stripe (e.g., the media error at sector 0x40 on Drive 2 in the present example). Since the media errors at sectors 0x20 and 0x30 are recovered, the media error MED ERR 3 on Drive 2 is at the lowest sector (e.g., 0x40) of the errors remaining on the stripe 110. Recovery of the data of the third media error MED ERR 3 may be performed similarly to the recovery operation for the first media error MED ERR 1 and the second media error MED ERR 2.

For example, referring to FIG. 8(A), the error recovery process may be continued by reading a portion 160 at sector 0x40 on Drive 1, and a portion 162 of the parity data from Drive 5. The portion 160, the portion 162, the data in the buffer of Drive 3 and the data in the buffer of Drive 4 may be used to recover the media error on Drive 2. For example, the data for the third media error MED ERR 3 may be recovered, in one example, by X-ORing the data read from Drive 1, the data available from Drive 3, the data available from Drive 4 and the parity data read from Drive 5.

Referring to FIG. 8(B), the recovery process may also perform a read to recover a remainder 164 of the data on the drive on which the media error data was just recovered (e.g., on Drive 2). By reading the data on the drive on which the media error data was just recovered, the present invention may detect possible additional media errors prior to where the next media error is known to be present (e.g., between sector 0x40 and sector 0x50). Moreover, reading the remainder of the data on the drive on which the media error data was just recovered may have an advantage of saving recovery reads for recovery of the media errors on the other drives. Referring to FIG. 8(C), a diagram of the stripe 110 is shown illustrating an example of the data population after the remainder 164 of the data on the Drive 2 is recovered.

Figure 9:
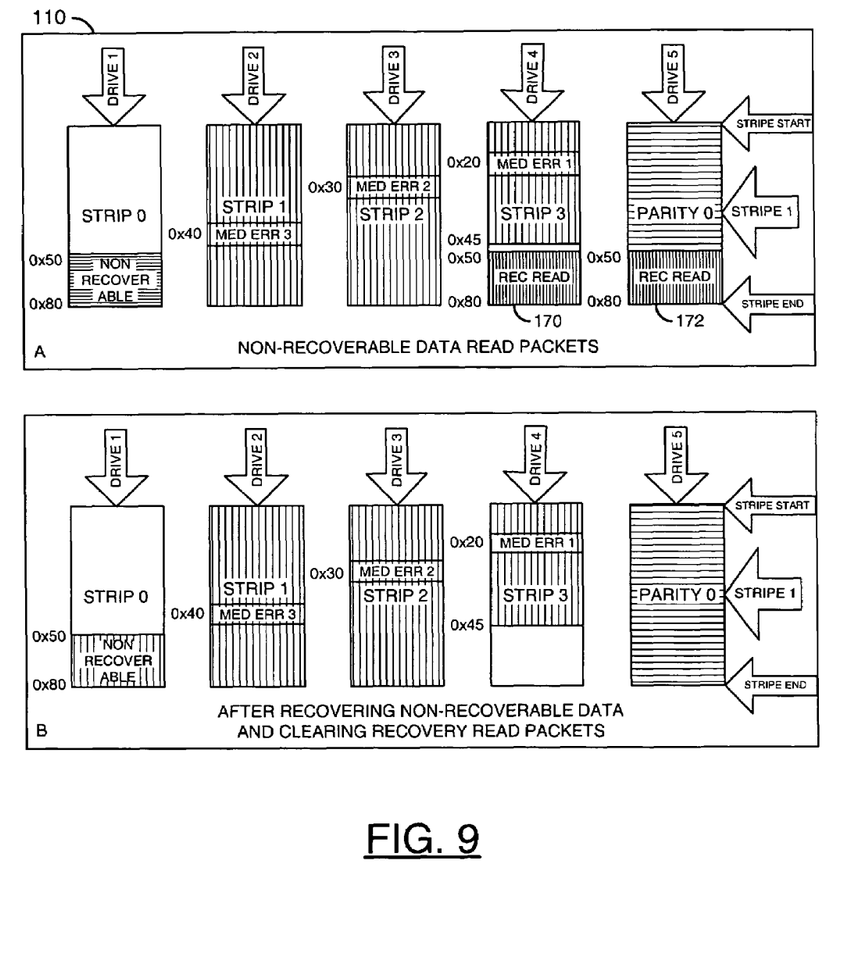

Referring to FIGS. 9(A-B), a set of diagrams is shown illustrating recovery of the data for the non-recoverable error of the stripe 110. The error recovery process in accordance with the present invention may continue by determining the type and sector of the one of the remaining detected errors that is closest to the start of the stripe sectors (e.g., the unrecoverable error at sector 0x50 on Drive 1 in the present example). The unrecoverable error on Drive 1 is at the lowest sector (e.g., 0x50) of the remaining errors on the stripe 110. Recovery of the data of the unrecoverable error may be performed similarly to the recovery operation for the media errors.

For example, referring to FIG. 9(A), the error recovery process may be continued by reading a portion 170 between sector 0x50 and sector 0x80 on Drive 4, and a portion 172 of the parity data from Drive 5. The portion 170, the portion 172, the data in the buffer of Drive 2 and the data in the buffer of Drive 3 may be used to recover the unrecoverable error on Drive 1. For example, the data for the unrecoverable error may be recovered, in one example, by X-ORing the data available from Drive 2, the data available from Drive 3, the data read from Drive 4 and the parity data read from Drive 5.

Referring to FIG. 9(B), a diagram of the stripe 110 is shown illustrating an example of the data population after the data for the non-recoverable error on the Drive 1 is recovered and recovery read packets are cleared. At any stage of the recovery operation, errors at the same sector on different drives may be detected and IO may be declared as unrecoverable. If a non-recoverable error occurs from more than one drive, the read IO may also be marked as non-recoverable.

Figure 10:
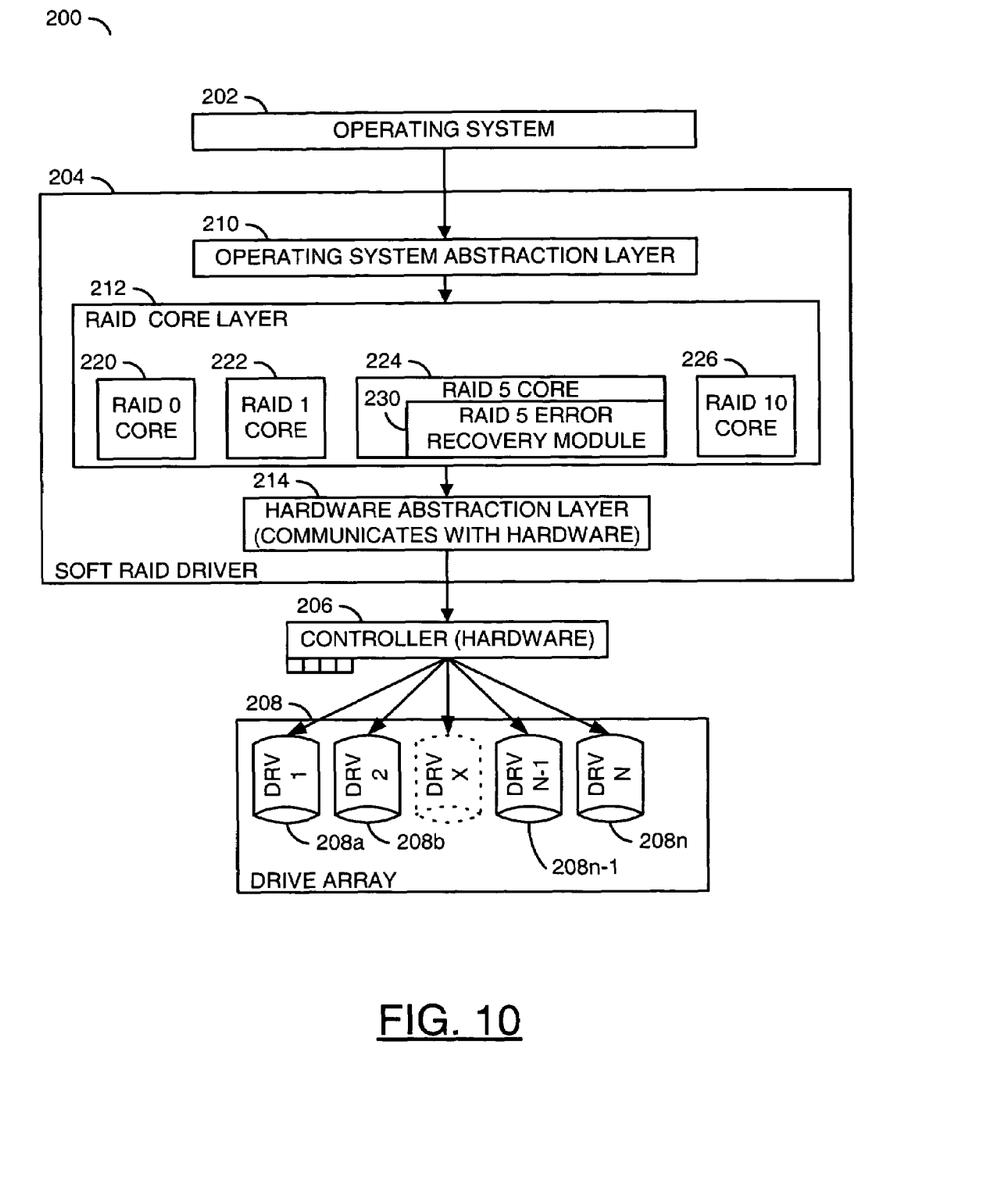
FIG. 10 is a block diagram illustrating a softRAID system in accordance with the present invention.

Referring to FIG. 10, a block diagram of a system 200 is shown illustrating a multiple disk RAID5 system in accordance with the present invention. In one example, the system 200 may comprise a block 202, a block 204, a block 206 and a block 208. The block 202 may be implemented, in one example, as an operating system layer. The block 204 may be implemented, in one example, as a RAID driver layer. The block 206 may be implemented, in one example, as a controller. The block 208 may be implemented as a drive array, In one example, the block 208 may comprise a number of blocks (or modules) 208a-208n. The blocks 208a-208n may be implemented, in one example, as hard drives. The hard drives 208a-208n may be the same size or different sizes. The blocks 202 and 204 may be implemented in software. The blocks 206 and 208 may be implemented in hardware.

The controller 206 may be configured to operate the hard drives 208a-208n as a RAID5 system in response to instructions from the driver layer 204. In one example, block 204 may comprise a block 210, a block 212, a block 214. The block 210 may be implemented as an operating system abstraction layer. The block 212 may be implemented as a RAID core layer. The block 214 may be implemented as a Hardware Abstraction Layer. The Hardware Abstraction layer 214 may be configured to communicate with the hardware controller 206.

The RAID core layer may comprise a block 220, a block 222, a block 224 and a block 226. The block 220 may be implemented, in one example, as a RAID 0 Core. The block 222 may be implemented, in one example, as a RAID 1 Core. The block 224 may be implemented, in one example, as a RAID 5 Core. The block 226 may be implemented, in one example, as a RAID 10 Core. The block 224 may comprise a block 230. The block 230 may be implemented, in one example, as a RAID 5 error recovery logic. The block 230 may be configured to perform the error recovery process described above in connection with FIGS. 2-9 and 12.

Figure 11:
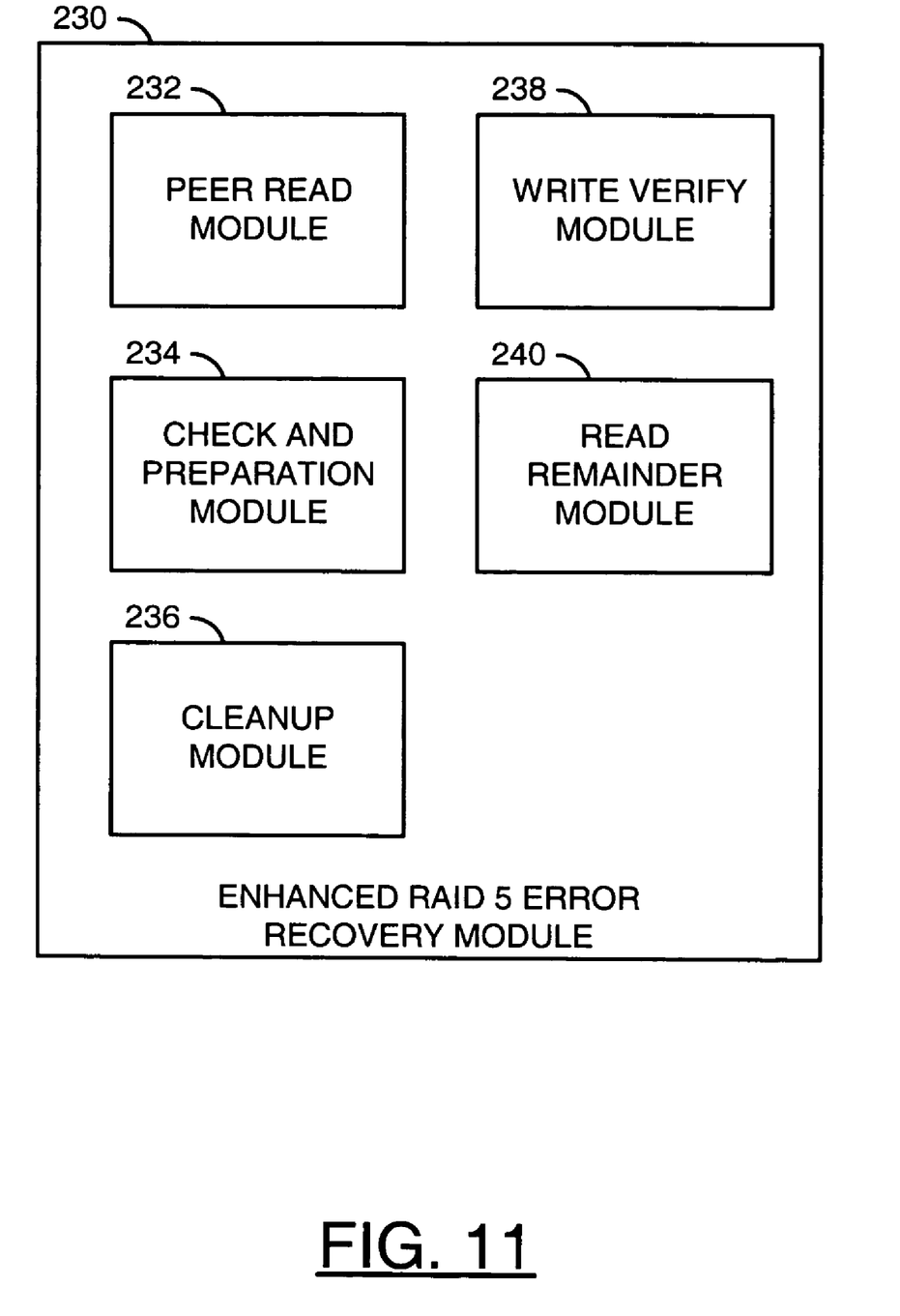
FIG. 11 is a more detailed block diagram illustrating a RAID 5 error recovery logic module of FIG. 10.

Referring to FIG. 11, a block diagram is shown illustrating an example implementation of the block 230 of FIG. 10. In one example, the block 230 may comprise a block 232, a block 234, a block 236, a block 238 and a block 240. The block 232 may be implemented as a peer read module. The block 234 may be implemented as a check and preparation module. The block 236 may be implemented as a cleanup module. The block 238 may be implemented as a write verify module. The block 240 may be implemented as a read remainder module.

The module 232 generally handles reading peer drive(s) data and parity drive data used to recover the missing data. The module 234 may be configured to check whether error recovery is possible for a particular IO operation with one or more errors. If error recovery is possible, the module 234 generally determines the error that should be recovered next and prepares for recovery of the selected error. The module 234 generally includes routines for parameter initialization, memory allocation and initialization of a soft state machine.

The module 236 may be configured to clean up the error recovery module after data is recovered successfully. The module 236 may also be configured to clean up the error recovery module after data is not recovered successfully. The module 238 generally performs a write verify operation on the sector on which a media error occurred and for which data is recovered. The write verify is generally issued to fix the media error data on the drive. A successful write verify on the media error sector will correct the error on the drive.

The module 240 generally performs a read remainder operation after the recovery of a media error. The read remainder operation generally involves reading the remainder of the strip in which the most recent error was recovered. If another error occurs (is detected) during the reading of the reminder of the strip, the error information becomes the latest error information for the strip. When additional errors are detected, the error recovery logic performs a new search to determine which error is the lowest LBA error and in which strip the error is located. When the newly found error is the lowest LBA error, the recovery process restarts with the newly found error. Otherwise, the recovery process restarts with the next lowest LBA error and the newly found error is queued based on position relative to the remaining errors to be recovered. In general, an advantage of the present invention is that the error recovery logic looks for the error with the lowest LBA to recover during each iteration. The module 240 is generally not active when the read remainder operation is not used.

Figure 12:
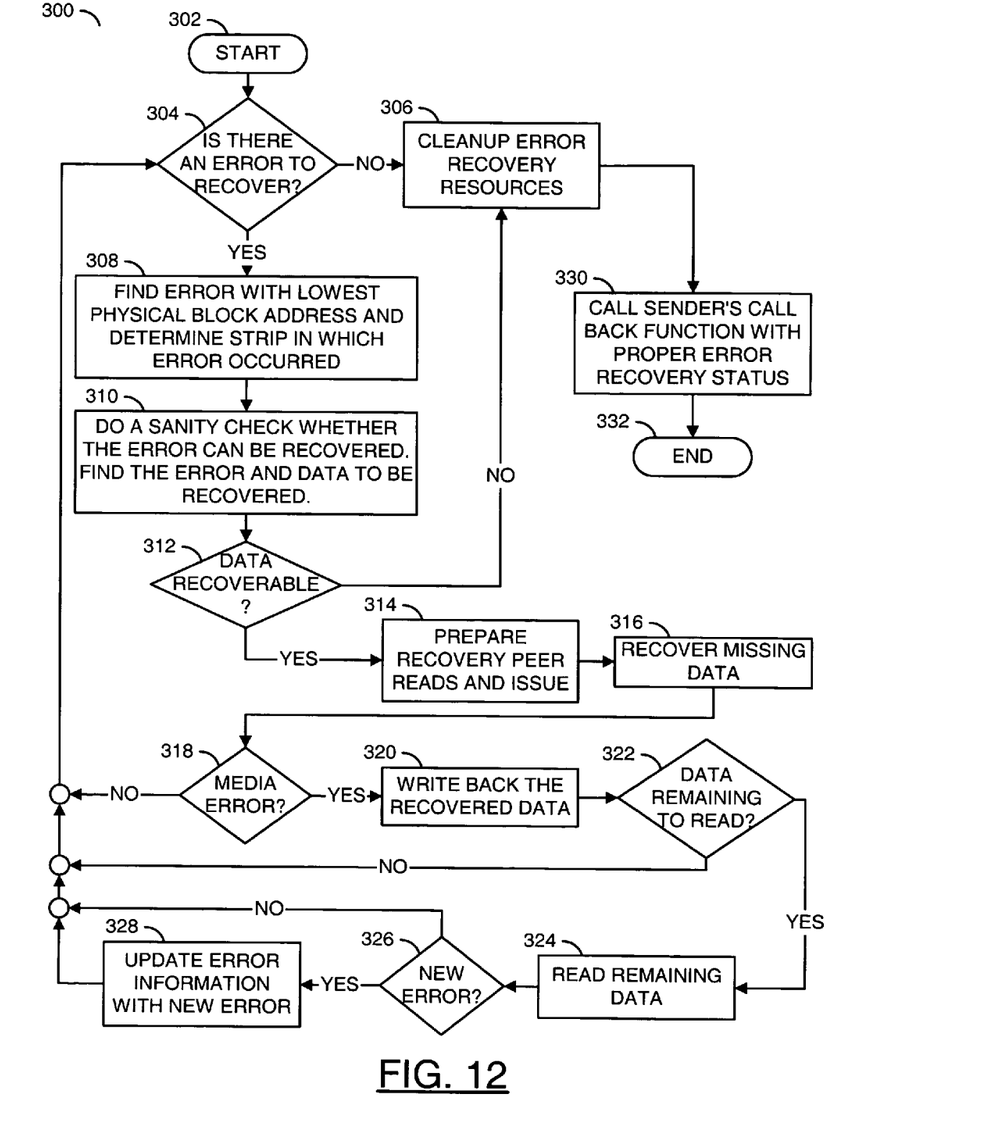
FIG. 12 is a flow diagram illustrating RAID 5 error recovery logic operation in accordance with the present invention.

Referring to FIG. 12, a flow diagram is shown illustrating a RAID 5 error recovery process 300 in accordance with the present invention. The process 300 may comprise, in one example, a state 302, a state 304, a state 306, a state 308, a state 310, a state 312, a state 314, a state 316, a state 318, a state 320, a state 322, a state 324, a state 326, a state 328, a state 330 and a state 332. The state 302 may be implemented as a start state. The state 304 may be implemented as a decision state. The state 306 may be implemented as a cleanup error recovery resources state. The state 308 may be implemented as a find lowest physical block error state. The state 310 may be implemented as a sanity check state. The state 312 may be implemented as a decision state. The state 314 may be implemented as a prepare recovery peer reads state. The state 316 may be implemented as a recover missing data state. The state 318 may be implemented as a decision state. The state 320 may be implemented as a write back state. The state 322 may be implemented as a decision state. The state 324 may be implemented as a read remaining data state. The state 326 may be implemented as a decision state. The state 328 may be implemented as a update error information state. The state 330 may be implemented as a return state. The state 332 may be implemented as an end state.

The process 300 generally starts in the start state 302 and moves to the state 304. In the state 304, the process 300 generally determines whether there is an error to recover. When there is no error to recover, the process 300 generally moves to the state 306. When there is an error to recover, the process 300 generally moves to the state 308.

In the state 308, the process 300 generally finds the error with the lowest physical block address (LBA) and determines in which strip the error occurred. The process 300 then moves to the state 310. In the state 310, the process 300 generally finds the error and data to be recovered, performs a sanity check to determine whether the error is recoverable or unrecoverable, and moves to the state 312. In the state 312, the process 300 moves to the state 306 when the error is unrecoverable and moves to the state 314 when the error is recoverable. In the state 314, the process 300 prepares recovery peer reads, issues the appropriate instructions to the drive controller and moves to the state 316.

In the state 316, the process 300 recovers the missing data and moves to the state 318. In the state 318, the process 300 determines whether the error was a media error. When the error is not a media error, the process 300 returns to the state 304. When the error is a media error, the process 300 moves to the state 320. In the state 320, the process 300 writes the recovered data back to the drive array and moves to the state 322. In the state 322, the process 300 determines whether there is remaining data to be read. When there is no remaining data to be read, the process 300 returns to the state 304. When there is remaining data to be read, the process 300 moves to the state 324. In the state 324, the process 300 reads the remaining data. When the remaining data is read, the process 300 moves to the state 326. In the state 326, the process 300 determines whether a new error occurred while reading the remaining data. When no new errors are detected, the process 300 returns to the state 304. When a new error has occurred, the process 300 moves to the state 328. In the state 328, the process 300 updates the error information with the new error and moves to the state 304.

In general, only media error data is written back, because media errors can be corrected with a write verify on the same sector. The error recovery subsystem generally regenerates the missing data by reading the peer drives and parity drives and does a write back. However, for non-media errors, the system does not perform a write back, but regenerates the data to provide the missing data to the upper layer (e.g., operating system/other RAID sub-systems). When the data can not be regenerated, the whole IO command is failed.

When the process 300 is in the state 306 (e.g., there are no errors to recover or the error is unrecoverable), the process 300 cleans up the error recovery resources. When the error recovery resources are cleaned up, the process 300 moves to the state 330. In the state 330, the process 300 generally calls the call back function of the sender with the appropriate error recovery status. The process 300 then moves to the state 332 and ends.

As used herein, a recoverable media error refers to errors that may be corrected by regenerating the missing data (e.g., by reading peer drives and parity drives) and performing a write back. A non-recoverable error refers to an error that cannot be corrected by performing a write back.

As would be apparent to those skilled in the relevant art(s), the signal paths illustrated in FIG. 10 represent logical data flows. The logical data flows are generally representative of physical data transferred between the respective blocks (or layers) by, for example, address, data, and control signals and/or busses. The system represented by the system 200 may be implemented in hardware, software or a combination of hardware and software according to the teachings of the present disclosure, as would be apparent to those skilled in the relevant art(s).

The function performed by the flow diagram of FIG. 12 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method for recovering errors on a multiple disk system comprising the steps of:
   A) determining a location and type for two or more errors in a plurality of blocks on said multiple disk system;

B) determining a current error of said two or more errors as the error with a lowest physical block address;

C) recovering data for the current error using data read from drives other than the drive containing the current error;

D) determining whether any further errors are present on the drive that contained the current error; and E) determining the current error of any remaining errors as the remaining error with the next lowest physical block address.

2. The method according to claim 1, wherein said multiple disk system comprises a RAID5 system.

3. The method according to claim 1, wherein said plurality of blocks comprise a stripe.

4. The method according to claim 1, wherein when the current error of said two or more errors comprises a media error, the data recovered for the current error is written back to the drive containing the current error.

5. The method according to claim 1, wherein when the current error of said two or more errors comprises a non-recoverable error, the data recovered for the current error is not written back to the drive containing the current error.

6. The method according to claim 1, wherein said plurality of blocks are arranged in strips.

7. The method according to claim 6, wherein one of said strips comprises parity information.

8. The method according to claim 6, further comprising the step of:

F) recovering any remaining data in a strip on the drive that contained the current error.

9. The method according to claim 8, wherein the steps D through F are repeated for each error detected in the plurality of blocks.

10. An apparatus for recovering errors on a multiple disk system comprising:

means for determining a location and type for two or more errors in a plurality of blocks on said multiple disk system;

means for determining a current error of said two or more errors as the error with a lowest physical block address;

means for recovering data for the current error using data read from drives other than the drive containing the current error;

means for determining whether any further errors are present on the drive that contained the current error; and means for determining the current error of any remaining errors as the remaining error with the next lowest physical block address.

11. An apparatus for recovering errors on a multiple disk system comprising:

a plurality of disk drives linked together as a single logical unit; and an error recovery logic circuit configured to (i) determine a location and type for two or more errors occurring in a plurality of strips on the plurality of disk drives, (ii) determine a current error of said two or more errors as the error with a lowest physical block address, (iii) recover data for the current error using data read from drives other than the drive containing the current error, (iv) determine whether any further errors are present on the drive that contained the current error, and (v) determine the current error of any remaining errors as the remaining error with the next lowest physical block address.

12. The apparatus according to claim 11, wherein said plurality of disk drives are configured as a RAID5 system.

13. The apparatus according to claim 11, wherein said plurality of strips comprise a stripe.

14. The apparatus according to claim 11, wherein when said current error of said two or more errors comprises a media error, the data recovered for the current error is written back to the drive containing the current error.

15. The apparatus according to claim 11, wherein when said current error of said two or more errors comprises a non-recoverable error, the data recovered for the current error is not written back to the drive containing the current error.

16. The apparatus according to claim 11, wherein one of said plurality of strips comprises parity information.

17. The apparatus according to claim 11, wherein said error recovery logic is further configured to recover any remaining data on the drive that contained the current error.

18. The apparatus according to claim 11, wherein the error recovery logic is further configured to recover each error detected in the plurality of strips based on a respective physical block address of each error.

19. The apparatus according to claim 11, wherein the error recovery logic is implemented within a RAID core layer of a RAID driver.

20. The apparatus according to claim 11, wherein the error recovery logic comprises:

a peer read module configured to read data from one or more peer data drives and a parity data drive;

a check and preparation module configured to determine whether the two or more detected errors are recoverable and order the two or more errors for recovery based upon the physical block address of each error;

a cleanup module configured to clean up the error recovery logic after a recovery process is completed;

a write verify module configured to perform a write verify operation on a block in which a current recoverable error occurred; and a read remainder module configured to read remaining data of a strip following the current recoverable error.

* * * * *